(12) United States Patent
Ishizuka et al.

(10) Patent No.: US 11,883,990 B2
(45) Date of Patent: Jan. 30, 2024

(54) HOLDING MEMBER, WORK MOLDING SYSTEM, AND WORK MOLDING METHOD

(71) Applicant: Dai Nippon Printing Co., Ltd., Tokyo (JP)

(72) Inventors: Kohei Ishizuka, Tsukuba (JP); Taisuke Uematsu, Tokyo (JP); Takashi Konno, Tsukuba (JP); Hiroyuki Atake, Tokyo (JP); Yoshiyuki Meiki, Tokyo (JP); Minoru Ariyama, Tokyo (JP); Masato Idegami, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 162 days.

(21) Appl. No.: 16/500,472

(22) PCT Filed: Apr. 3, 2018

(86) PCT No.: PCT/JP2018/014308
§ 371 (c)(1),
(2) Date: Oct. 3, 2019

(87) PCT Pub. No.: WO2018/186414
PCT Pub. Date: Oct. 11, 2018

(65) Prior Publication Data
US 2020/0122374 A1  Apr. 23, 2020

(30) Foreign Application Priority Data

Apr. 4, 2017  (JP) .................................. 2017-074281
Feb. 22, 2018  (JP) .................................. 2018-029642
Feb. 26, 2018  (JP) .................................. 2018-032517

(51) Int. Cl.
*B29C 45/42* (2006.01)
*B29C 45/17* (2006.01)

(52) U.S. Cl.
CPC .......... *B29C 45/42* (2013.01); *B29C 45/1761* (2013.01)

(58) Field of Classification Search
CPC ............................. B29C 45/42; B29C 45/1761
(Continued)

(56) References Cited

U.S. PATENT DOCUMENTS 4,994,224 A    2/1991  Itoh et al.
5,800,759 A *  9/1998  Yamazaki ......... B29C 45/14008
                                                        264/163

(Continued)

FOREIGN PATENT DOCUMENTS

CN    1 525 909 A    9/2004
CN    104 884 223 A  9/2015
(Continued)

OTHER PUBLICATIONS

Machine translation JPH06270199A (Year: 1994).*
(Continued)

*Primary Examiner* — Matthew J Daniels
*Assistant Examiner* — Wayne K. Swier
(74) *Attorney, Agent, or Firm* — Locke Lord LLP

(57) ABSTRACT

A work holding mechanism includes a body part having a three-dimensional shape including at least a recess or a protrusion, and an adsorption part for holding a work by adsorbing the work onto the body part in conformity to the three-dimensional shape of the recess or the protrusion provided in the body part. The work is held by being adsorbed in conformity to the three-dimensional shape of the body part, and, therefore, the amount of usage of the work in a work molding system can be reduced as compared with when the work is held so as to have a flat shape.

10 Claims, 13 Drawing Sheets

(58) Field of Classification Search
USPC .......................................................... 264/163
See application file for complete search history.

(56) References Cited

U.S. PATENT DOCUMENTS

| | | | |
|---|---|---|---|
| 9,636,856 B2 | 5/2017 | Momono et al. | |
| 9,770,857 B2 | 9/2017 | Seki et al. | |
| 2006/0035090 A1* | 2/2006 | Damo | B29C 67/246 264/161 |
| 2009/0022963 A1* | 1/2009 | Suga | B32B 27/302 156/324 |
| 2010/0025869 A1* | 2/2010 | Suzuishi | B29C 45/0025 425/543 |
| 2014/0339727 A1* | 11/2014 | Momono | B29C 45/42 264/161 |

FOREIGN PATENT DOCUMENTS

| | | | |
|---|---|---|---|
| DE | 20 2006 017295 U1 | | 1/2007 |
| JP | H05-309690 A | | 11/1993 |
| JP | 06-270199 A | * | 9/1994 ....... B29C 45/14008 |
| JP | 06-270199 A | | 9/1994 |
| JP | 2011-148576 A | | 8/2011 |
| JP | 2011148576 A | * | 8/2011 |
| JP | 2012-020446 A | | 2/2012 |
| JP | 2012020446 A | * | 2/2012 |
| JP | 5866398 B2 | | 2/2016 |
| JP | 5926352 B2 | | 5/2016 |
| WO | 93/02848 A1 | | 2/1993 |

OTHER PUBLICATIONS

Kar. K, Sharma, S. D., Behera S., Kumar. P Development of Rubber Pressure Molding Technique using Silicone Rubber to Fabricate Fiber-reinforce Plastic Components Based on Glass Fiber and Epoxy Resin. Journal of Elastomers and Plastics vol. 39—Apr. 2007 pp. 117-131 (Year: 2007).*
Machine translation JP2011148576A (Year: 2011).*
Machine translation JP2012020446A (Year: 2012).*
Supplementary European Search Report dated Oct. 26, 2020, issued for European patent application No. 18781448.8.
International Search Report dated Jul. 10, 2018, issued for PCT/JP2018/014308 and English translation thereof.
Written Opinion of the International Searching Authority dated Jul. 10, 2018, issued for PCT/JP2018/014308 and English translation thereof.
Office Action dated Mar. 26, 2021, issued for the Chinese Patent Application No. 201880022147.7 and English translation thereof.
Partial European Search Report dated Feb. 9, 2023, issued for European Patent Application No. 22207920.4.

* cited by examiner

HOLDING MEMBER, WORK MOLDING SYSTEM, AND WORK MOLDING METHOD

TECHNICAL FIELD

The present invention relates to a work holding mechanism for holding a work in a work molding system that molds a work and the work molding system, as well as a work holding method using such a work holding mechanism. The present invention also relates to a work molding system for producing a molded article by molding a formed work formed by a work forming device, a conveying device for conveying the formed work and a molded article produced by molding the formed work, a holding member provided in such a conveying device, and a work molding method using such a work molding system.

BACKGROUND ART

Conventionally, in a work molding system for producing a molded article by molding a work (e.g., a film) using an injection molding machine or the like, the following processes are performed in order, step by step. More specifically, the process of feeding out a film from an original film roll, the process of cutting the fed out film into a sheet form, the process of heating the cut sheet-like film in order to soften the film, the process of vacuum molding the heated film using a mold, the process of injecting a resin, and the process of taking out a molded article are performed in order, process by process.

JP 5866398 B2 discloses a holding hand that clamps only an upper end edge of a sheet-like work as a work holding mechanism for holding a work that is to be molded in a work molding system. More specifically, a sheet-like work that is clamped only at the upper end edge has a flat shape extending straight downward due to gravity. In addition, the sheet-like work held in such a state is located between molds, whereby the work is molded using the molds. JP 5866398 B2 also discloses a configuration for shortening the production time of a molded article by providing a heating mechanism outside an injection molding machine, and preheating a film while vacuum molding another film.

JP 5926352 B2 discloses an injection molding system configured such that a robot hand of an articulated robot is installed inside an injection molding machine, and a molded article is taken out from molds using the robot hand.

SUMMARY OF INVENTION

Since the work having a flat shape extending straight downward is molded using molds as described above, the holding hand of the work molding system disclosed in JP 5866398 B2 is problematic in that it is difficult to reduce the amount of usage of the work in the work molding system. More specifically, for example, in the case of molding a work using molds or the like so as to be curved in a projecting shape, the amount of usage of the work can be reduced more when a work held so as to have a projecting shape, in advance, in conformity to the shape of the molds is delivered to the molds, than when a work held in a non-curving, flat state is delivered to the molds. However, the problem is that a work holding mechanism capable of holding a work in a curved state in such a manner has not been available hitherto.

Since the processes for producing a molded article are performed in order in the conventional injection molding system, there is a problem that any delay in each of the processes directly affects the delay of the production time of the molded article in the case of producing a molded article which requires a long time for, for example, heating and injection-molding a sheet-like film.

Since the heating part is provided outside the injection molding machine in the injection molding system disclosed in JP 5866398 B2, it is necessary to convey a film from the heating part to the injection molding machine after heating the film by the heating part. Accordingly, a plurality of robots such as a robot for supplying the film to the injection molding machine and a robot for conveying a molded article need to be introduced, resulting in a problem in that the overall configuration of the system becomes complicated. On the other hand, in the injection molding system disclosed in JP 5926352 B2, a sheet-like film is heated in a state in which only one side of the film is held. Therefore, in the case of a thin sheet-like film, there is a problem that the film may undergo wrinkling, warping or the like when heated. Furthermore, a sheet-like film that has undergone wrinkling, warping or the like cannot be sufficiently adsorbed to the molds during vacuum molding, so that the sheet-like film cannot be brought into close contact with the molds, resulting in a problem in that the design quality of the molded article is reduced. Since a robot hand is installed inside the injection molding device in the injection molding system disclosed in JP 5926352 B2, the movable range of the robot hand is narrow, resulting in a problem in that the robot hand may in some cases interfere with the constituent members of the injection molding machine.

The present invention has been made in consideration of such circumstances, and an object of the present invention is to provide a work holding mechanism, a work molding system and a work holding method capable of reducing the amount of usage of the work in the work molding system by holding the work by adsorbing the work so as to conform to a body part having a three-dimensional shape comprising at least a recess or a protrusion.

Also, an object of the present invention is to provide a work molding system, a conveying device, a holding member and a work molding method capable of shortening the overall processing time when producing molded articles by sequentially molding a plurality of formed works, because, while a molded article is produced by performing molding of a formed work by the molding device, a formed work that is to be molded next is heated while being conveyed toward the molding device.

A work holding mechanism of the present invention for holding a work in a work molding system that molds the work comprises: a body part having a three-dimensional shape comprising at least a recess or a protrusion; and an adsorption part for holding the work by adsorbing the work onto the body part in conformity to the three-dimensional shape of the recess or the protrusion provided in the body part.

In the work holding mechanism of the present invention, the body part may have a configuration in which a base member and an elastic member formed of an elastic material are layered, and the elastic member may come into contact with the work when the work is adsorbed, by the adsorption part, in conformity to the three-dimensional shape of the body part.

In this case, the elastic material may be a silicone resin.

In addition, the body part may comprise a frame-shaped member having an opening.

The work holding mechanism of the present invention may further comprise a holding assist member for assisting holding of the work by the frame-shaped member, the holding assist member being provided inside the opening of the frame-shaped member.

In the work holding mechanism of the present invention, the adsorption part may hold the work by vacuum suction.

In the work holding mechanism of the present invention, the body part may comprise a porous material having a plurality of suction holes, and the work may be adsorbed onto the body part in conformity to the three-dimensional shape of the recess or the protrusion provided in the body part by the adsorption part sucking gas through the suction holes.

In the work holding mechanism of the present invention a plurality of through holes may be provided in the body part, and the work may be adsorbed onto the body part in conformity to the three-dimensional shape of the recess or the protrusion provided in the body part by the adsorption part sucking gas through the through holes.

In this case, each of the through holes may be a slit.

Alternatively, each of the through holes may have a circular shape, an elliptic shape, or a polygonal shape.

A conveying device of the present invention for conveying a formed work formed by a work forming device and a molded article produced by molding the formed work comprises: a holding member for holding the formed work and the molded article; and a movement mechanism for moving the holding member, the holding member includes a work holding part configured to hold and heat the formed work, and a molded article holding part configured to hold the molded article.

In the conveying device of the present invention, the movement mechanism may comprise an articulated robot.

A holding member of the present invention including a frame portion for holding a formed work formed by a work forming device and a molded article produced by molding the formed work comprising: a work holding part configured to hold the formed work, and to heat the formed work by a heating member provided on a side of a structural material to which the frame portion is attached; and a molded article holding part configured to hold the molded article produced by molding the formed work.

In the holding member of the present invention, the work holding part may hold the formed work by vacuum suction.

In the holding member of the present invention, the molded article holding part may hold the molded article by vacuum suction.

In the holding member of the present invention, the frame portion may have a substantially rectangular shape, and the work holding part may be provided on a front surface of the frame portion, and the molded article holding part is provided on a back surface of the frame portion.

In the holding member of the present invention, a configuration for causing the work holding part to hold the formed work formed by the work forming device, and a configuration for causing the molded article holding part to hold the molded article may be different from each other.

A work molding system of the present invention for producing a molded article by molding a work comprising: a work forming device configured to form a work; a molding device configured to perform molding of a formed work formed by the work forming device; and a conveying device configured to convey the formed work formed by the work forming device from the work forming device to the molding device, the conveying device includes a work holding mechanism for holding the formed work, and a movement mechanism for moving the work holding mechanism, and the work holding mechanism includes a body part having a three-dimensional shape comprising at least a recess or a protrusion, and an adsorption part for holding the formed work by adsorbing the formed work onto the body part in conformity to the three-dimensional shape of the recess or the protrusion provided in the body part.

In the work molding system of the present invention, the molding device may include a female mold having a three-dimensional shape comprising at least a recess, and the body part of the work holding mechanism may include a protrusion that is configured to be fitted to at least a portion of the recess of the mold of the molding device.

In the work molding system of the present invention, the molding device may perform vacuum molding and resin injection molding of the formed work formed by the work forming device.

In the work molding system of the present invention, the movement mechanism of the conveying device may comprise an articulated robot.

A work molding system of the present invention for producing a molded article by molding a work comprising: a work forming device configured to form a work; a molding device configured to perform molding of a formed work formed by the work forming device; and a conveying device configured to convey the formed work formed by the work forming device from the work forming device to the molding device, the conveying device includes a holding member for holding the formed work formed by the work forming device and a molded article molded from the formed work by the molding device, and a movement mechanism for moving the holding member, and the holding member includes a work holding part configured to hold and heat the formed work formed by the work forming device, and a molded article holding part configured to hold the molded article molded from the formed work by the molding device.

In the work molding system of the present invention, the molding device may perform vacuum molding and resin injection molding of the formed work formed by the work forming device.

In this case, the molding device may be configured to perform vacuum molding on one surface of the formed work fed to the molding device, and to perform resin injection molding on another surface thereof.

In the work molding system of the present invention, the movement mechanism of the conveying device may comprise an articulated robot.

In the work molding system of the present invention, the work holding part of the holding member of the conveying device may hold the formed work by vacuum suction.

In the work molding system of the present invention, the molded article holding part of the holding member of the conveying device may hold the molded article by vacuum suction.

In the work molding system of the present invention, the holding member of the conveying device may include a frame portion having a substantially rectangular shape, and the work holding part may be provided on a front surface of the frame portion of the conveying device, and the molded article holding part is provided on a back surface of the frame portion.

In the work molding system of the present invention, a configuration for causing the work holding part to hold the formed work and a configuration for causing the molded article holding part to hold the molded article may be different from each other in the holding member of the conveying device.

A work holding method of the present invention for holding a work in a work molding system that molds the work comprises: preparing a work; and holding the work by adsorbing the work in conformity to a three-dimensional shape of a body part including at least a recess or a protrusion.

A work molding method of the present invention comprises: forming a work; after causing a holding member of a conveying device to hold a formed work that has been formed, conveying the formed work to a molding device by the conveying device, and heating the formed work held by the holding member during the conveying; and producing a molded article by performing molding of the formed work by the molding device, and, while a molded article is produced by performing molding of the formed work by the molding device, a formed work that is to be molded next by the molding device is heated while being conveyed toward the molding device by the conveying device.

In the work molding method of the present invention, when the conveying device causes a formed work that is to be molded by the molding device to be held by the molding device, the conveying device may take out, from the molding device, a molded article produced by the molding device.

In this case, when the molded article produced by the molding device is taken out from the molding device by the conveying device, the molded article may be held in the holding member at a portion different from a portion at which a formed work is held when the formed work is conveyed to the molding device by the conveying device.

DESCRIPTION OF EMBODIMENTS

Figure 1:
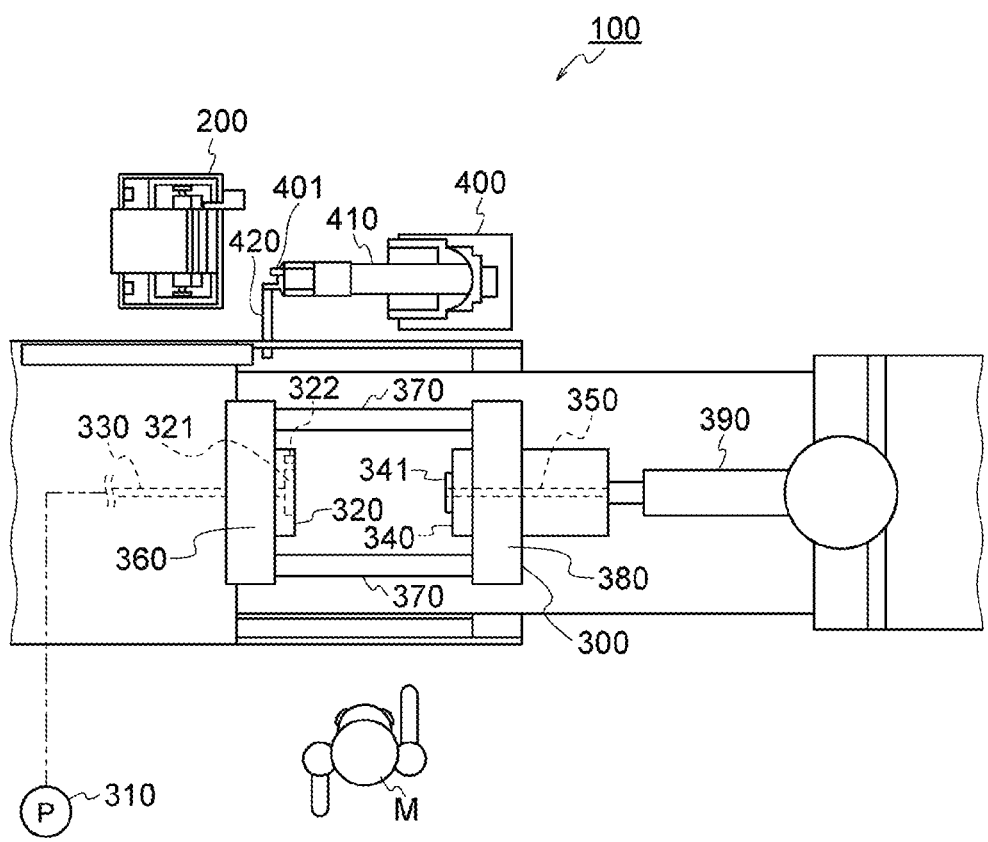
FIG. 1 is a top view schematically showing a configuration of a work molding system according to an embodiment of the present invention.
Figure 2:
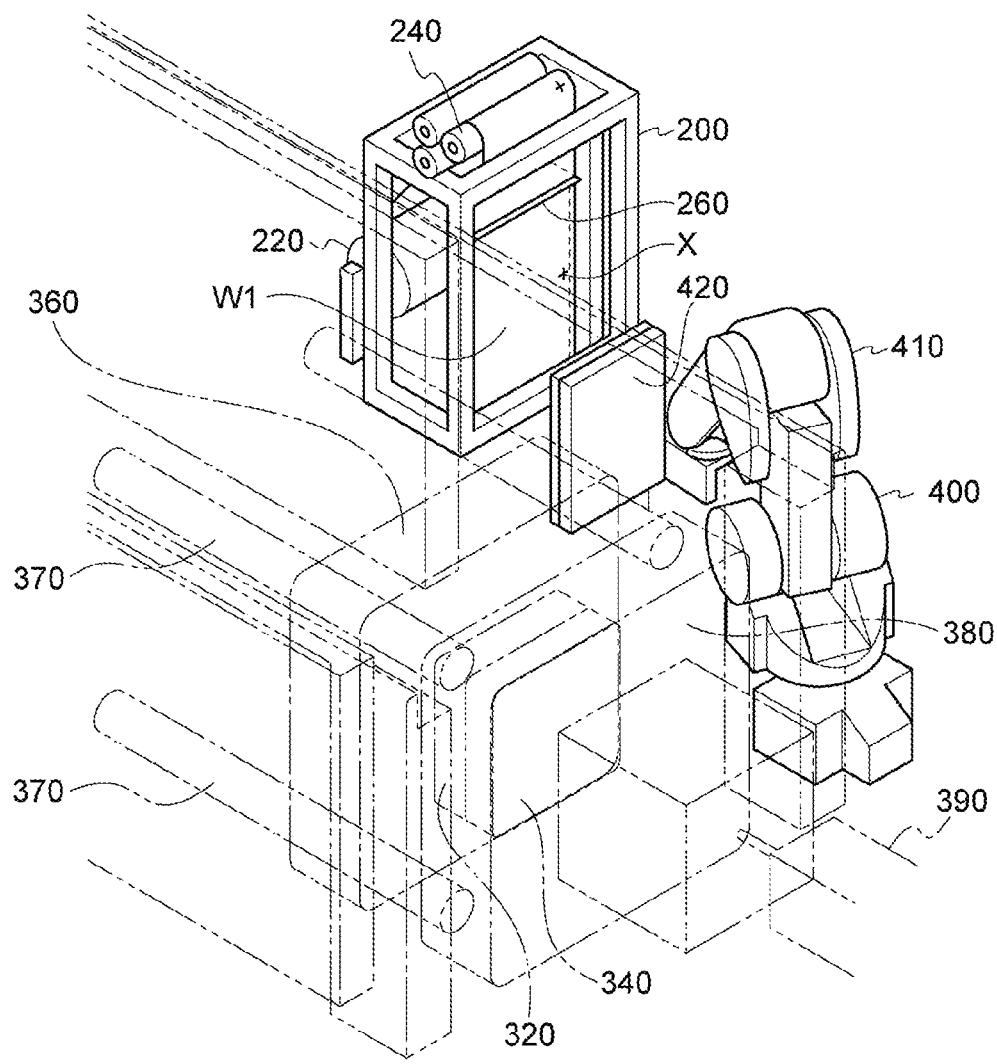
FIG. 2 is a perspective view of the work molding system shown in FIG. 1.
Figure 6:
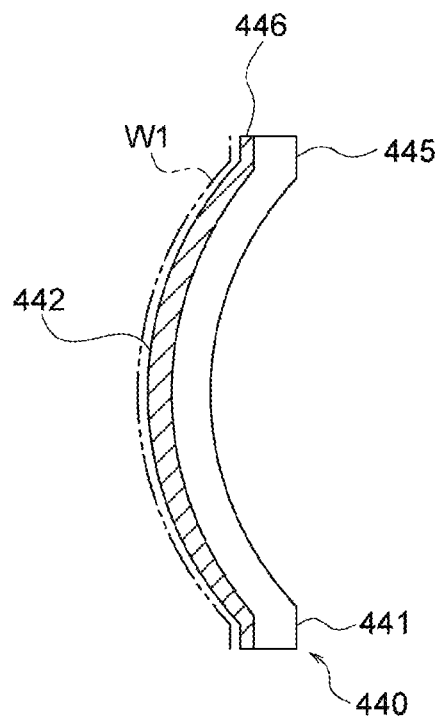
FIG. 6 is a side view showing a schematic configuration of the body part of the work holding mechanism shown in FIG. 4, etc.
Figure 7:
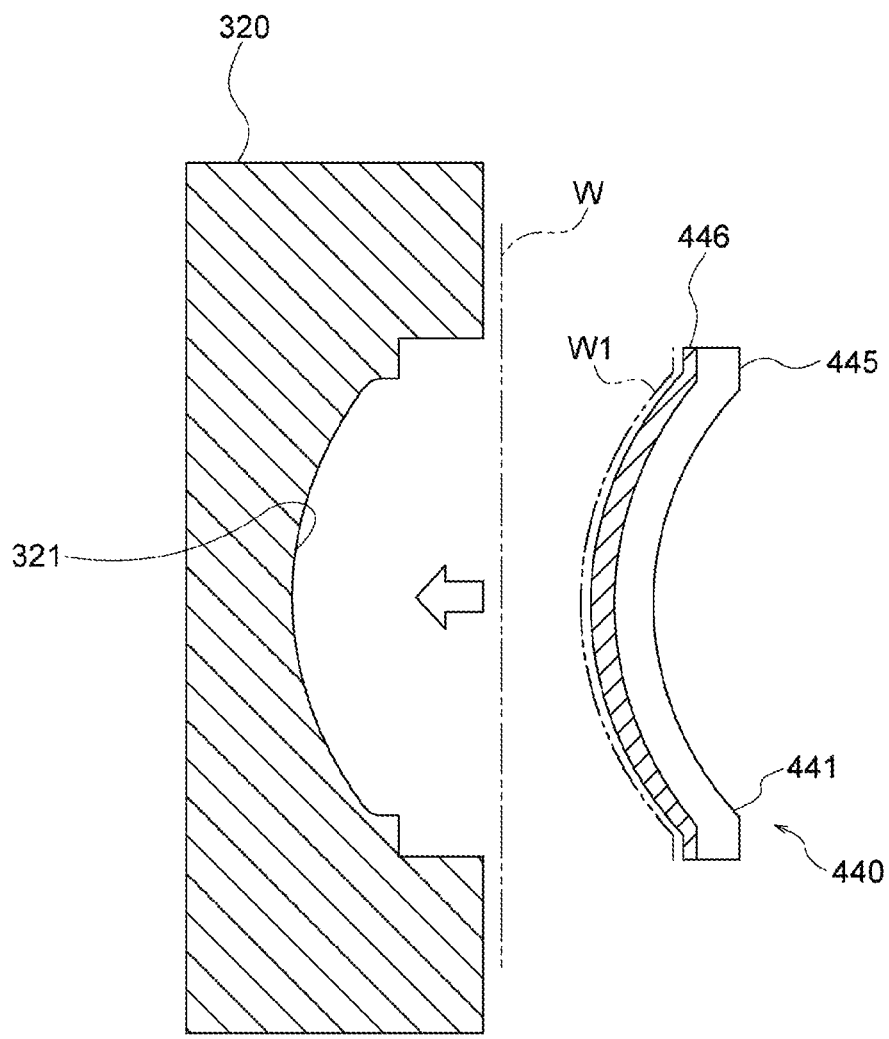
FIG. 7 is a side view showing a schematic configuration in a case where a work held by the work holding mechanism shown in FIG. 4, etc., is delivered to a molding device.
Figure 15:
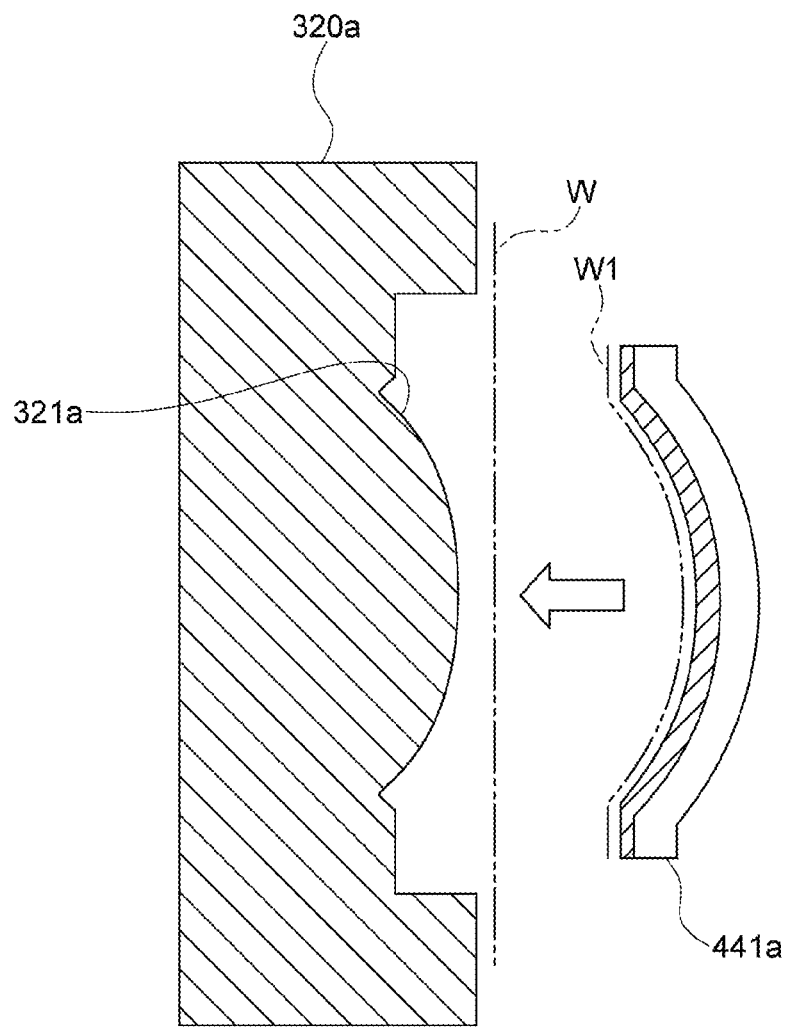
FIG. 15 is a side view schematically showing another configuration of the work holding mechanism and the molding device in the work molding system shown in FIG. 1.
Figure 16:
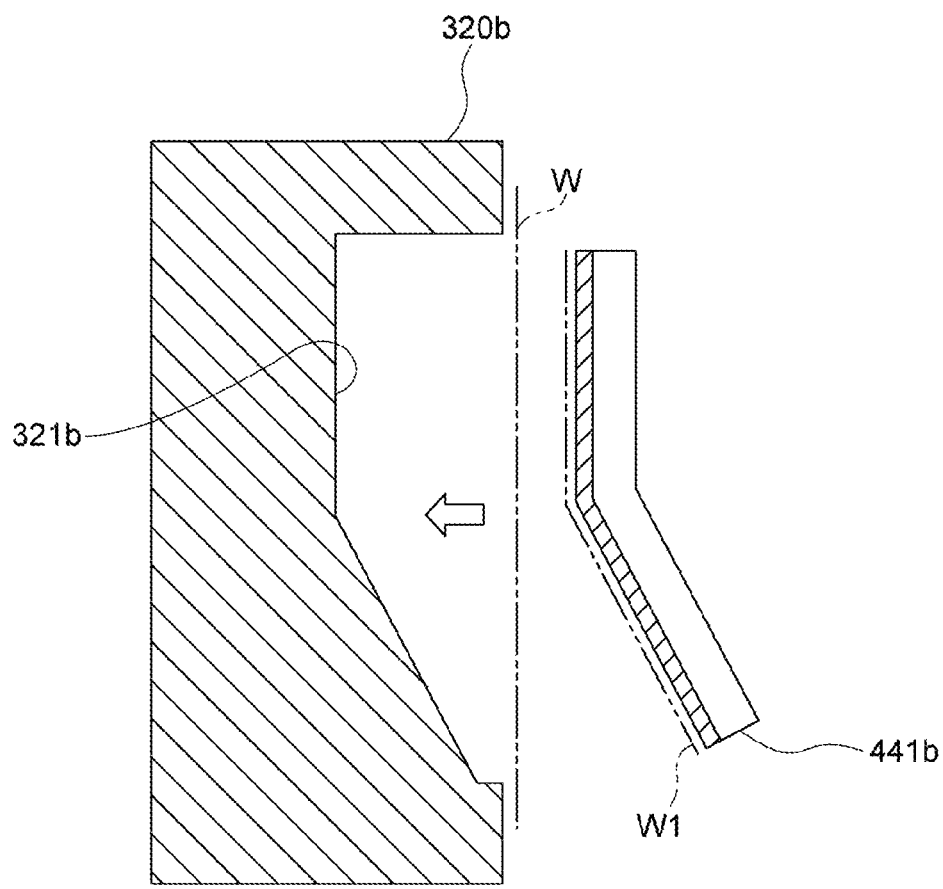
FIG. 16 is a side view schematically showing yet another configuration of the work holding mechanism and the molding device in the work molding system shown in FIG. 1.

Hereinafter, an embodiment of the present invention will be described with reference to the drawings. FIGS. 1 to 21 are diagrams showing a work molding system according to the present embodiment, and a work molding method using such a work molding system. It is noted that in FIG. 1, an operator performing operations in the work molding system according to the present embodiment is indicated by reference character M. In FIG. 2, a positioning mark provided on an original film roll is indicated by reference character X. In FIGS. 2 to 4, 6 to 8, 10 to 13, and 15 to 21, a formed work before being molded by a molding device is indicated by reference character W1, and a molded article produced as a result of the formed work being molded by the molding device is indicated by reference character W2. In FIGS. 7, 15, and 16, a formed work held by a conventional work holding mechanism is indicated by reference character W.

First, a work molding system 100 according to the present embodiment will be described with reference to FIGS. 1 and 2. As shown in FIGS. 1 and 2, the work molding system 100 according to the present embodiment includes a work forming device 200 that forms a work such as a sheet-like film, a molding device 300 that molds a formed work formed by the work forming device 200, and a conveying device 400 that conveys the formed work formed by the work forming device 200 from the work forming device 200 to the molding device 300. In such a work molding system 100, first, a work such as a sheet-like film is formed by the work forming device 200, then the formed work formed by the work forming device 200 is conveyed from the work forming device 200 to the molding device 300 by the conveying device 400, and thereafter a molded article is produced by molding the formed work by the molding device 300. According to a work molding method of the present embodiment, while a molded article is produced by molding the formed work by the molding device 300, a formed work that is to be molded next by the molding device 300 is heated while being conveyed from the work forming device 200 toward the molding device 300 by the conveying device 400. The details of the constituent members of such a work molding system 100 will be described in the following.

As shown in FIG. 2, the work forming device 200 includes a conveying part 240 such as a conveying roller that intermittently conveys a work such as a band-shaped film fed out from an original film roll 220, and a cutting part 260 such as a cutter that cuts a leading end portion of the band-shaped work conveyed by the conveying part 240, and a sheet-like work is formed as a result of the leading end portion of the band-shaped work being cut by the cutting part 260. In addition, as shown in FIG. 2, a plurality of positioning marks (indicated by the reference character X) are formed in the vicinity of an end portion of the original film roll 220 in the width direction so as to be aligned with predetermined intervals in a direction along the feeding-out direction of the original film roll 220. The band-shaped work is cut by the cutting part 260 of the work forming device 200 such that one positioning mark is included in a predetermined portion of the cut sheet-like work. As will be described later, the positioning of the conveying device 400 relative to the sheet-like work is performed using the positioning mark when the sheet-like work is taken out from the work forming device 200 by the conveying device 400. Here, as the work that is fed out from the original film roll 220 in the work forming device 200, for example, a single-layer or a multilayer film material comprising any of an acrylic, a PET, an ABS resin, a polyethylene, a polycarbonate, and a polypropylene is used. When, for example, a multilayer film material is used as the work, the total thickness of the film may be within the range of 50 to 1000 µm. More specifically, the thickness of each of the layers is determined according to the number of layers, and is defined within the range of 50 to 1000 µm, which is the total thickness.

The molding device 300 is configured to perform vacuum molding and resin injection molding of a formed work formed by the work forming device 200. More specifically, the molding device 300 is configured to perform vacuum molding on one surface of a formed work fed to the molding device 300, and to perform resin injection molding on the other surface thereof. To describe specifically, as shown in FIGS. 1, 2, etc., the molding device 300 includes a movable mold 320, a fixed mold 340, a movable mold holding part 360 that holds the movable mold 320, and a fixed mold holding part 380 that holds the fixed mold 340, and the molding device 300 is configured such that a cavity (hollow portion) having a recessed shape is formed between the movable mold 320 and the fixed mold 340 when the movable mold 320 and the fixed mold 340 are in contact with each other. More specifically, a recess 321 is formed in the movable mold 320, and a protrusion 341 that can be placed in the recess 321 is provided to the fixed mold 340, and a cavity having a recessed shape is formed between the protrusion 341 and the recess 321 when the movable mold 320 and the fixed mold 340 are in contact with each other so as to place the protrusion 341 in the recess 321.

The formed work fed to the molding device 300 by the conveying device 400 is vacuum-molded using the movable mold 320 of the molding device 300. More specifically, as shown in FIG. 1, a gas flow path 330 is connected to the recess 321 of the movable mold 320, and a suction pump 310 is connected to the flow path 330. Then, gas is sucked from the flow path 330 by the suction pump 310, whereby the formed work fed to the molding device 300 by the conveying device 400 is vacuum-sucked onto the movable mold 320. At this time, the formed work is placed in the recess 321 of the movable mold 320, and accordingly, the formed work is vacuum-molded so as to conform to the shape of the recess 321. As shown in FIG. 1, etc., a positioning mark 322 is formed on the movable mold 320, and, as will be described later, the positioning of a movement mechanism 410 (i.e., the formed work) relative to the movable mold 320 is performed using the positioning mark 322 when the formed work is delivered from the conveying device 400.

As shown in FIG. 1, the fixed mold holding part 380 is provided with a resin supply path 350 for supplying a resin such as a thermoplastic resin into the cavity formed between the movable mold 320 and the fixed mold 340 when the movable mold 320 and the fixed mold 340 are in contact with each other, and a resin supply part 390 that supplies the resin to the resin supply path 350 is connected to the resin supply path 350. As a result of the resin being supplied from the resin supply part 390 through the resin supply path 350 into the cavity having a recessed shape formed between the movable mold 320 and the fixed mold 340 when the movable mold 320 and the fixed mold 340 are in contact with each other, resin injection molding is performed on the front surface (specifically, the surface opposite to the surface facing the recess 321) of the formed work that has been vacuum-molded using the movable mold 320. Here, for example, one of an acrylic, an ABS resin, an AES resin, an AS resin, a polycarbonate, and a polypropylene or a material obtained by mixing these resins is used as the resin supplied into the cavity between the movable mold 320 and the fixed mold 340 from the resin supply part 390 through the resin supply path 350. The resin supplied into the cavity may contain a gradient material in which the interfaces of the above-described plurality of materials are molten.

Figure 10:
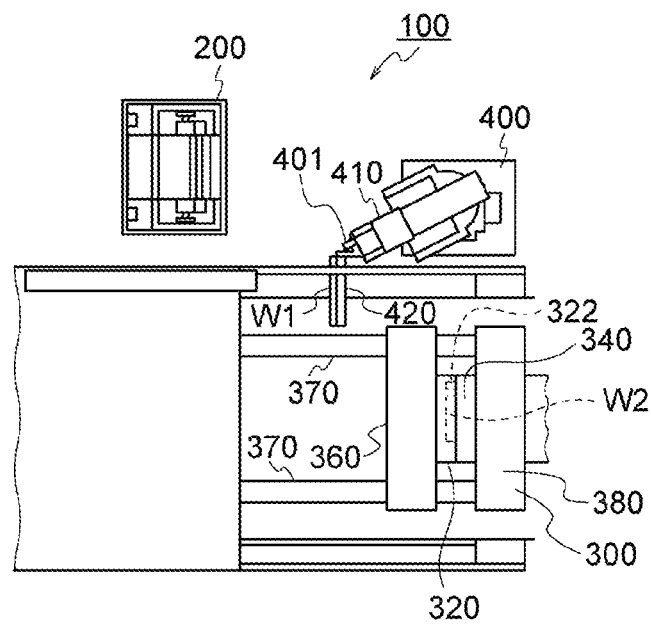
FIG. 10 is a top view showing a state during the course of producing a molded article by molding a work in the work molding system shown in FIG. 1, etc.

As shown in FIGS. 1 and 2, the molding device 300 includes a guide part 370 that guides the movable mold holding part 360, and the movable mold holding part 360 is configured to be moved along the guide part 370 in a direction toward the fixed mold holding part 380 and a direction away from the fixed mold holding part 380. It is noted that FIG. 1 shows a state when the movable mold holding part 360 is spaced apart from the fixed mold holding part 380, and FIG. 10 shows a state when the movable mold 320 and the fixed mold 340 are in contact with each other by the movable mold holding part 360 approaching the fixed mold holding part 380.

Here, in the present embodiment, it is preferable that the temperature for molding the formed work by the molding device 300 is 80 to 160° C. It is preferable that, when vacuum molding of the formed work is performed by the molding device 300, the degree of vacuum is in the range from approximately 100,000 Pa, which is atmospheric pressure, at maximum to 0.1 Pa at minimum. It is preferable that the pressing pressure applied to the formed work by the movable mold 320 and the fixed mold 340 is in the range of 0 to 40,000 kN.

The conveying device 400 serves to convey a formed work formed by the work forming device 200 from the work forming device 200 to the molding device 300, and to take out a molded article molded from the formed work by the molding device 300 from the molding device 300. Specifically, as shown in FIGS. 1 and 2, the conveying device 400 includes a holding member 420 for holding a formed work formed by the work forming device 200 and a molded article molded from the formed work by the molding device 300, and a movement mechanism 410 for moving the holding member 420. In the present embodiment, an articulated robot is used as the movement mechanism 410. With such an articulated robot, it is possible to change the orientation of a formed work and a molded article held by the holding member 420. Since an articulated robot is used as the movement mechanism 410 of the conveying device 400, and the movement mechanism 410 is provided outside the molding device 300, it is possible to prevent the movement mechanism 410 and the constituent members of the work molding system 100 from coming into contact with each other even if the space between the movable mold 320 and the fixed mold 340, in the case of being spaced apart from each other, is small.

It is noted that the movement mechanism 410 is not limited to an articulated robot. A mechanism other than an articulated robot can be used as the movement mechanism 410 as long as the mechanism can convey the formed work formed by the work forming device 200 from the work forming device 200 to the molding device 300, and take out the molded article molded from the formed work by the molding device 300 from the molding device 300.

Figure 3:
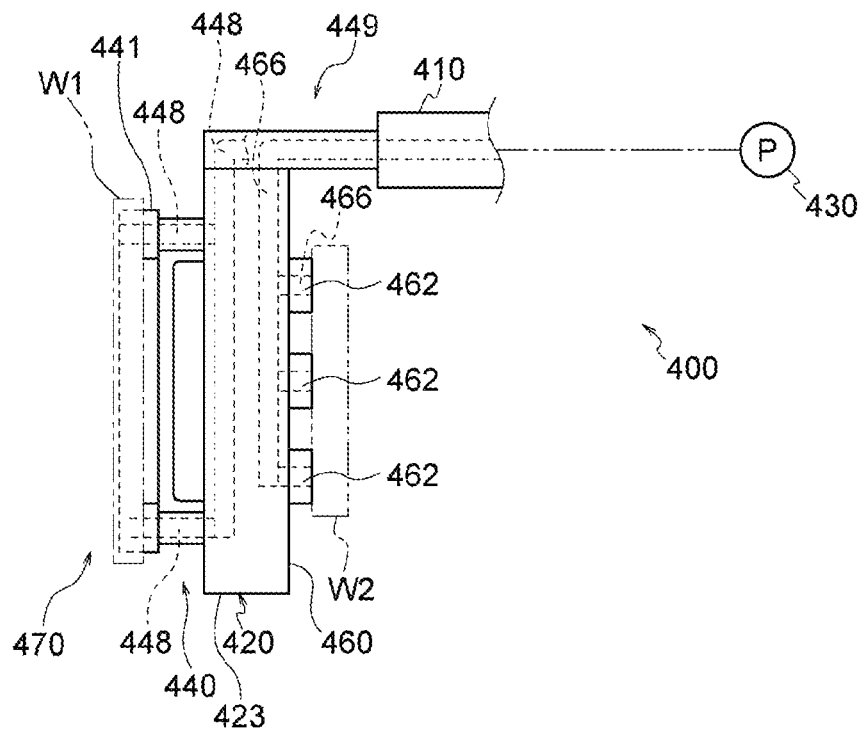
FIG. 3 is a top view showing a configuration of a holding member of a conveying device of the work molding system shown in FIG. 1, etc.

As shown in FIG. 3, etc., the holding member 420 includes a frame portion 423 provided with an opening. A work holding mechanism 440 for holding a formed work (indicated by reference character W1 in FIG. 3) formed by the work forming device 200 is provided on one surface (e.g., the front surface) of the holding member 420, and a molded article holding part 460 for holding a molded article (indicated by reference character W2 in FIG. 3) molded from the formed work by the molding device 300 is provided on the other surface (e.g., the back surface) of the holding member 420. As described above, the holding member 420 is configured to be moved by the movement mechanism 410, and, therefore, the work holding mechanism 440 and the molded article holding part 460 are also configured to be moved by the movement mechanism 410.

As shown in FIG. 1, 9, etc., the conveying device 400 includes an image capturing part 401 such as a camera, and a control part 490 that controls the movement mechanism 410 on the basis of an image captured by the image capturing part 401. More specifically, the image capturing part 401 is configured to capture images of the positioning mark (indicated by reference character X in FIG. 2) provided on the formed work formed by the work forming device 200, and the positioning mark 322 provided on the movable mold 320. The control part 490 is configured to control the movement mechanism 410 on the basis of the positioning mark 322, etc., in an image captured by the image capturing part 401. More specifically, the control part 490 is configured to control the image capturing part 401 such that an image of the formed work is captured by the image capturing part 401 before the formed work formed by the work forming device 200 is held by the work holding mechanism 440. In addition, the control part 490 is configured to perform the positioning of the movement mechanism 410 (more specifically, the work holding mechanism 440) relative to the formed work by controlling the movement mechanism 410 of the conveying device 400 on the basis of the position of the positioning mark in an image of the formed work captured by the image capturing part 401. Accordingly, it is possible to hold the formed work by the holding mechanism 440 after performing the positioning of the work holding mechanism 440 relative to the formed work.

The control part 490 is configured to control the image capturing part 401 to capture an image of the positioning mark 322 formed on the movable mold 320, also before the formed work held by the work holding mechanism 440 is delivered to the molding device 300. The control part 490 is also configured to perform the positioning of the movement mechanism 410 (more specifically, the formed work held by the work holding mechanism 440) relative to the movable mold 320 by controlling the movement mechanism 410 on the basis of the position of the positioning mark 322 in an image of the movable mold 320 captured by the image capturing part 401. Accordingly, it is possible to deliver the formed work to the movable mold 320 after performing the positioning of the formed work relative to the movable mold 320. In other words, in the present embodiment, the position at which the formed work is handled by the conveying device 400 is corrected on the basis of the positioning mark formed on the formed work or the positioning mark 322 provided on the movable mold 320. In this manner, positioning is performed both when the formed work formed by the work forming device 200 is held by the work holding mechanism 440, and when the formed work is delivered to the movable mold 320, thus making it possible to produce high-quality molded articles by the molding device 300 with good reproducibility.

Figure 4:
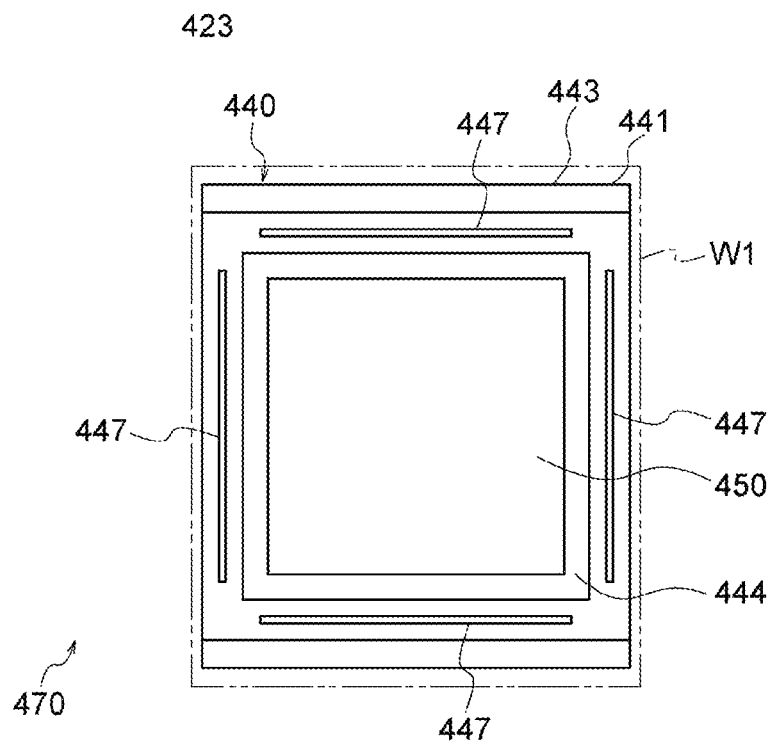
FIG. 4 is a front view showing the details of a configuration of a work holding mechanism in the holding member shown in FIG. 3.
Figure 5:
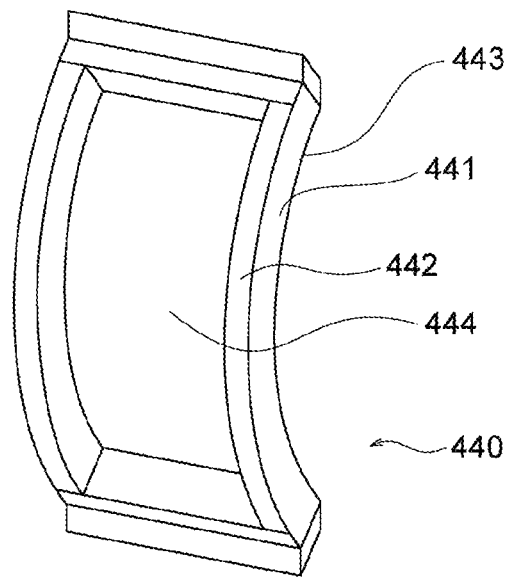
FIG. 5 is a perspective view showing a schematic configuration of a body part of the work holding mechanism shown in FIG. 4.

The details of the configuration of the work holding mechanism 440 will be described with reference to FIGS. 3 to 7. Here, FIG. 4 is a front view showing the details of the configuration of the work holding mechanism 440 in the holding member 420 shown in FIG. 3. In other words, FIG. 4 is a configuration diagram showing the configuration of a body part 441 of the work holding mechanism 440 in the holding member 420 shown in FIG. 3, as viewed rightward from the left side in FIG. 3. FIGS. 5 and 6 are a perspective view and a side view of the schematic configuration of the body part 441 of the work holding mechanism 440 shown in FIG. 4, and FIG. 7 is a side view showing a schematic configuration in a case where a formed work held by the work holding mechanism 440 shown in FIG. 4, etc., is delivered to the movable mold 320 of the molding device 300.

As shown in FIGS. 3 to 7, the work holding mechanism 440 includes a body part 441 having a three-dimensional shape including at least a recess or a protrusion. In the present embodiment, the body part 441 is constituted by a frame-shaped member 443 having a substantially rectangular shape including a protrusion 442 and an opening 444, and the protrusion 442 is formed in a recessed shape so as to be curved toward the recess 321 formed in the movable mold 320. More specifically, the body part 441 is formed such that the shape of a formed work held by the body part 441 and the three-dimensional shape of the recess 321 of the movable mold 320 are substantially the same (see FIG. 7). In addition, a plurality of (specifically, four) elongated slits 447 are provided in the body part 441, and portions in the vicinity of four sides of a sheet-like formed work are vacuum-sucked using the slits 447. In this manner, the formed work is held by being adsorbed in conformity to the three-dimensional shape of the body part 441. More specifically, as shown in FIG. 3, a gas flow path 448 is connected to each of the slits 447, and a suction pump 430 such as a rotary pump is connected to the flow path 448. Then, the portions in the vicinity of the four sides of the sheet-like formed work are vacuum-sucked to the slits 447 by sucking gas from the flow paths 448 by the suction pump 430. That is, in the work holding mechanism 440 according to the present embodiment, an adsorption part 449 that adsorbs the formed work in conformity to the three-dimensional shape of the body part 441 composed of the suction pump 430, the slits 447, the flow paths 448, etc.

The body part 441 has a configuration in which a base member 445 and an elastic member 446 composed of an elastic material are layered. The elastic member 446 is configured to come into contact with the formed work when the formed work is adsorbed in conformity to the three-dimensional shape of the body part 441 by the adsorption part 449. Here, it is preferable that the base member 445 is made of a material having a light weight and a high rigidity (e.g., an aluminum material or a carbon fiber material). It is also preferable that the elastic member 446 is made of a flexible material such as a resin in order to increase the adhesion between the elastic member 446 and the formed work. As will be described later, the formed work is heated by a heater 450 (heating member) in a state in which the formed work is held by the body part 441, and, therefore, it is more preferable that the elastic member 446 is composed of a silicone resin or the like having heat resistance. It is noted that the elastic member 446 may be made of a material such as a rubber having heat resistance.

A heater 450 is attached to the work holding mechanism 440, and a sheet-like formed work that has been vacuum-sucked to the slits 447 provided in the body part 441 is heated by the heater 450 to 50 to 200° C., for example. Consequently, the sheet-like formed work molded by the molding device 300 is softened. In other words, a work holding part 470 that holds the formed work and heats the formed work in the present embodiment is composed of the work holding mechanism 440 and the heater 450.

Although the heater 450 is disposed inside the opening 444 of the frame-shaped member 443 in the present embodiment, the placement of the heater 450 is not limited to the above-described configuration. For example, the heater 450 may be disposed inside an opening provided in the frame portion 423 of the holding member 420, rather than inside of the opening 444 of the frame-shaped member 443. Alternatively, the heater 450 may be disposed on the side of a structural material (e.g., a constituent member of the conveying device 400) to which the frame portion 423 is attached.

The formed work held by the work holding mechanism 440 of the present embodiment is delivered to the movable mold 320 in a state as shown in FIG. 7. That is, the formed work held by the work holding mechanism 440 is delivered to the movable mold 320 in a state in which the recess 321 of the movable mold 320 and the protrusion 442 of the body part 441 of the work holding mechanism 440 are opposed to each other. Consequently, it is possible to reduce the amount of usage of the work used in the work molding system 100 of the present embodiment. More specifically, in a conventional work holding mechanism, a sheet-like work is held so as to have a flat shape extending straight downward. In addition, the work held in this state is delivered to a mold (indicated by reference character W in FIG. 7). Accordingly, considering the elongation and the deformation of the work that may occur when the work is delivered to the mold or is molded by the molding device, a sheet-like work that has been formed to have a larger size than the shapes of the recess, the protrusion, and so forth provided on the mold needs to be delivered to the mold. In this respect, in the present embodiment, the work holding mechanism 440 is configured to hold the formed work so as to conform to the three-dimensional shape of the body part 441 including the protrusion 442, and to deliver the formed work in this state to the movable mold 320. Accordingly, as shown in FIG. 7, it is possible to use a formed work that has been formed to have substantially the same size as the shape of the recess 321 provided in the movable mold 320. In this manner, in the work molding system 100 according to the present embodiment, it is possible to use a formed work having a smaller size than that of a formed work used for a conventional configuration that holds the formed work so to as to have a flat shape, thus making it possible to reduce the amount of usage of the work in the work molding system 100. In addition, the body part 441 is configured to hold the formed work so as to conform to the shape of the recess 321 of the movable mold 320, and to deliver the formed work in this state to the movable mold 320, and, therefore, the formed work can be easily vacuum-molded by the movable mold 320 so as to conform to the shape of the recess 321.

It is noted that a plurality of through holes having a circular shape, an elliptic shape, or a polygonal shape may be provided in the body part 441, instead of providing the plurality of slits 447 in the body part 441. In addition, by sucking gas through these through holes, a sheet-like formed work may be adsorbed onto the body part 441 so as to conform to the three-dimensional shape of the body part 441. Alternatively, instead of providing the plurality of slits 447 in the body part 441, the body part 441 may be formed of a porous material such as a sponge having a plurality of suction holes. By sucking gas through the suction holes, a sheet-like formed work may be adsorbed onto the body part 441 so as to conform to the three-dimensional shape of the body part 441.

Figure 8:
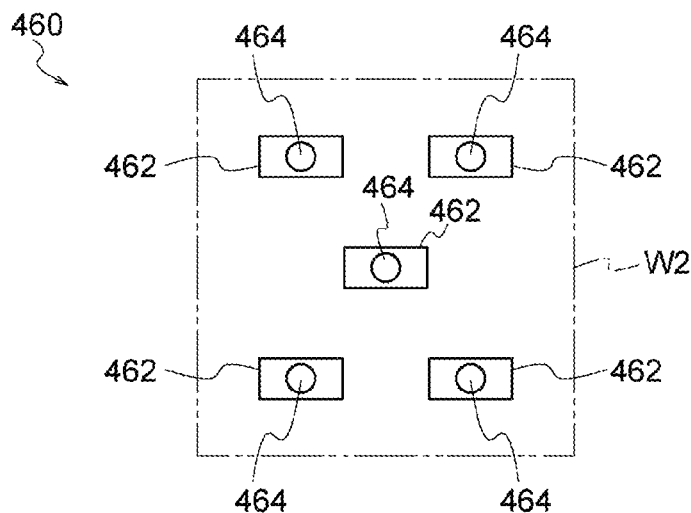
FIG. 8 is a front view showing the details of a configuration of a molded article holding part in the holding member shown in FIG. 3.
Figure 9:
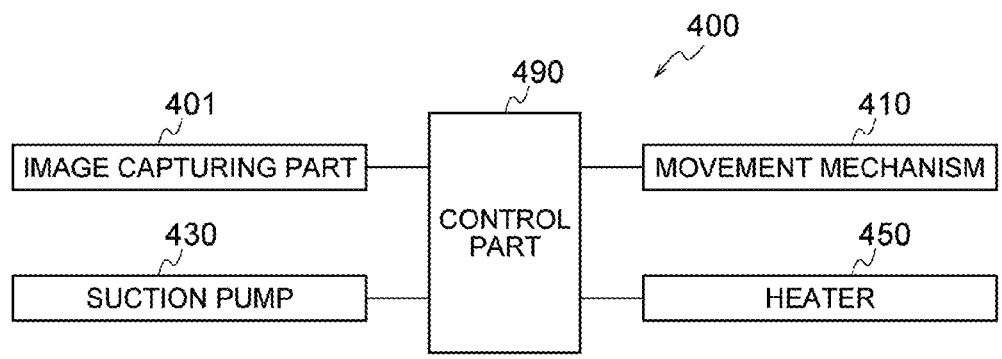
FIG. 9 is a functional block diagram showing a configuration of a control system of the conveying device of the work molding system shown in FIG. 1, etc.

Next, the details of the configuration of the molded article holding part 460 in the holding member 420 will be described with reference to FIGS. 3 and 8. FIG. 8 is a configuration diagram showing the configuration of the molded article holding part 460 in the holding member 420 shown in FIG. 3, as viewed leftward from the right side in FIG. 3. As shown in FIGS. 3 and 8, a plurality of suction pads 462 are provided on the molded article holding part 460, and a suction hole 464 is provided in each of the suction pads 462. A plurality of portions of the molded article are vacuum-sucked through the suction holes 464 of the plurality of suction pads 462. More specifically, each of the suction pads 462 is composed of a material having flexibility such as a rubber so that a molded article will not be damaged by the suction pads 462 when the molded article is sucked onto the suction pads 462. As shown in FIG. 3, a gas flow path 466 is connected to each of the suction holes 464, and the suction pump 430 is connected to the flow paths 466. Then, a plurality of portions of the molded article are vacuum-sucked to the suction holes 464 by sucking gas from the flow paths 466 by the suction pump 430.

In the molded article holding part 460 of the holding member 420, the positions at which the suction pads 462 are provided can be changed. The direction of suction of the molded article by the suction pads 462 can also be changed. Here, the direction of suction refers to the direction of suction of the air in the suction holes 464 of the suction pads 462. For example, the direction of suction of the molded article in the molded article holding part 460 shown in FIG. 8 is the leftward direction in FIG. 3. By changing the direction of suction at the suction pads 462, the molded article can be sucked by the suction pads 462, for example, in the upward direction and the downward direction in FIG. 3. In this manner, the positions at which the suction pads 462 are provided and the direction of suction by the suction pads 462 can be changed, and, therefore, the molded article holding part 460 can stably hold molded articles having various shapes.

It is noted that the suction pump 430 is configured to suck gas from either or both of the flow paths 448 associated with the work holding mechanism 440 and the flow paths 466 associated with the molded article holding part 460. Specifically, the connection destination of the suction pump 430 can be switched to either or both of the flow paths 448 and the flow paths 466 by a switching valve (not shown).

In this manner, in the present embodiment, the configuration for causing the work holding mechanism 440 (work holding part 470) to hold the formed work and the configuration for causing the molded article holding part 460 to hold the molded article, in the holding member 420 are different from each other.

Next, a work molding method using the work molding system 100 having such a configuration will be described with reference to FIGS. 10 to 13.

When the operator turns on the power supply of the conveying device 400 in producing a molded article by molding a work by the work molding system 100 according to the present embodiment, the heating of the heater 450 in the conveying device 400 is started. Then, if it is determined that the heater 450 has reached a predetermined temperature, a cycle of producing a molded article by sequentially mold a work is started, as described below.

In the cycle of producing a molded article by sequentially molding a work, first, a sheet-like work is formed by the work forming device 200. Specifically, a band-shaped work that has been fed out from the original film roll 220 in the work forming device 200 is conveyed by the conveying part 240 such as a roller so that a leading end portion of the band-shaped work reaches a predetermined position. The work holding mechanism 440 is moved by the movement mechanism 410 such that the work holding mechanism 440 in the holding member 420 of the conveying device 400 is opposed to the leading end portion of the work that has reached the predetermined position in the work forming device 200. As described above, the capturing of an image of the formed work by the image capturing part 401 is performed before the formed work is held by the work holding mechanism 440. The control part 490 of the conveying device 400 is configured to control the movement mechanism 410 on the basis of the positioning mark in an image of the formed work captured by the image capturing part 401, and accordingly, the positioning of the work holding mechanism 440 relative to the formed work is performed.

Then, if it is determined that the work holding mechanism 440 in the holding member 420 of the conveying device 400 is opposed to a leading end portion of the work that has reached a predetermined position in the work forming device 200, gas is sucked from the flow paths 448 by the suction pump 430 in the conveying device 400. Consequently, the leading end portion of the band-shaped work fed out from the original film roll 220 in the work forming device 200 is vacuum-sucked in conformity to the three-dimensional shape of the body part 441 of the work holding mechanism 440. Then, if it is determined that the leading end portion of the band-shaped work has been vacuum-sucked in conformity to the three-dimensional shape of the body part 441 of the work holding mechanism 440, the leading end portion of the band-shaped work is cut by the cutting part 260 in the work forming device 200, whereby a sheet-like work is formed. It is noted that the sheet-like work formed in this manner has been vacuum-sucked in conformity to the three-dimensional shape of the body part 441 of the work holding mechanism 440.

If it is determined that the leading end portion of the band-shaped work has been cut by the cutting part 260 in the work forming device 200, and a sheet-like work is formed, the formed work is conveyed from the work forming device 200 to the molding device 300 by the conveying device 400. At this time, the formed work vacuum-sucked onto the body part 441 of the work holding mechanism 440 is heated by the heater 450, whereby the formed work is softened. Then, when the formed work conveyed by the conveying device 400 has reached the vicinity of the molding device 300, the formed work enters a standby state in the vicinity of the molding device 300 in a state in which the formed work is held by the work holding mechanism 440 of the holding member 420, as shown in FIG. 10. As will be described later, while a formed work is conveyed from the work forming device 200 to the molding device 300 and is heated by the conveying device 400, an operation of producing a molded article by molding the preceding formed work is performed in the molding device 300. Then, when a molded article has been produced in the molding device 300, the movable mold holding part 360 moves in a direction (i.e., leftward in FIG. 11) so as to be spaced apart from the fixed mold holding part 380, whereby the movable mold 320 is spaced apart from the fixed mold 340 (such a state in which the movable mold 320 is spaced apart from the fixed mold 340 is also referred to as "molds are opened"), as shown in FIG. 11.

Figure 11:
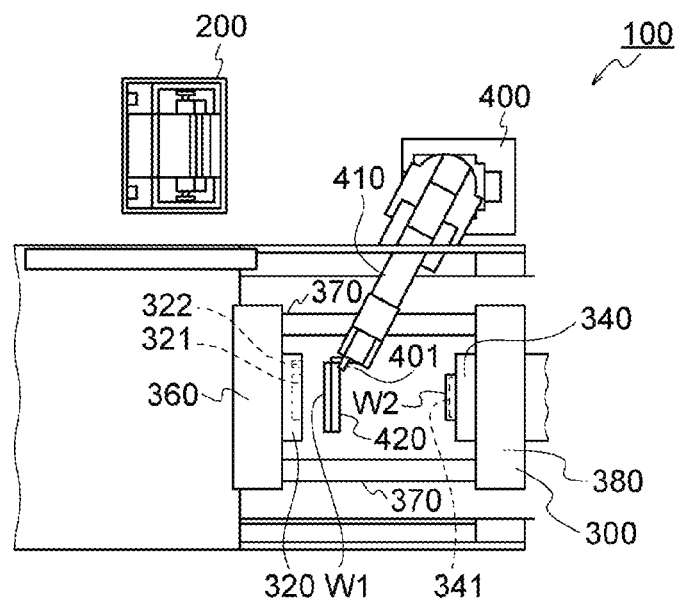
FIG. 11 is a top view showing a state, continued from the state shown in FIG. 10, during the course of producing a molded article by molding a work in the work molding system shown in FIG. 1, etc.
Figure 12:
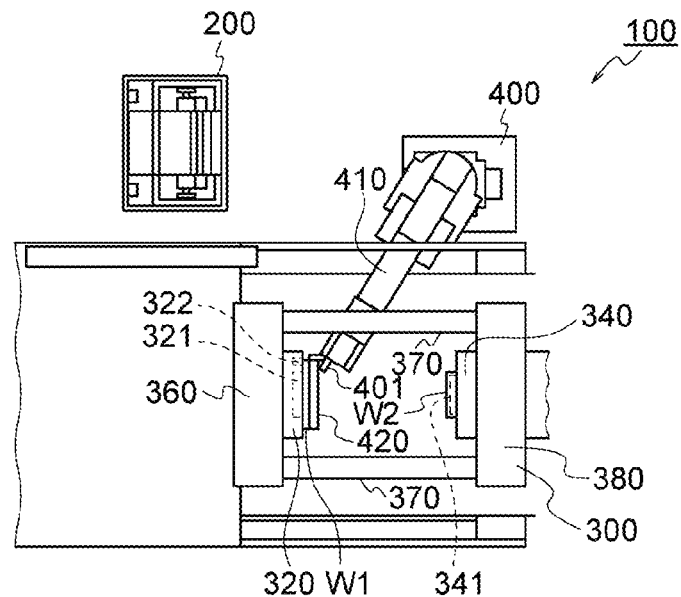
FIG. 12 is a top view showing a state, continued from the state shown FIG. 11, during the course of producing a molded article by molding a work in the work molding system shown in FIG. 1, etc.

If it is determined that the movable mold 320 has been spaced apart from the fixed mold 340 as shown in FIG. 11, the holding member 420 is moved by the movement mechanism 410 such that the holding member 420 holding the formed work by the work holding mechanism 440 comes close to the movable mold 320 as shown in FIG. 12. As described above, the capturing of an image of the movable mold 320 (specifically, the positioning mark 322) by the image capturing part 401 is also performed before the formed work held by the work holding mechanism 440 is delivered to the molding device 300. The control part 490 of the conveying device 400 is configured to control the movement mechanism 410 on the basis of the positioning mark 322 in an image of the movable mold 320 captured by the image capturing part 401, and accordingly, the positioning of the work holding mechanism 440 (i.e., the formed work) relative to the movable mold 320 is performed.

Figure 13:
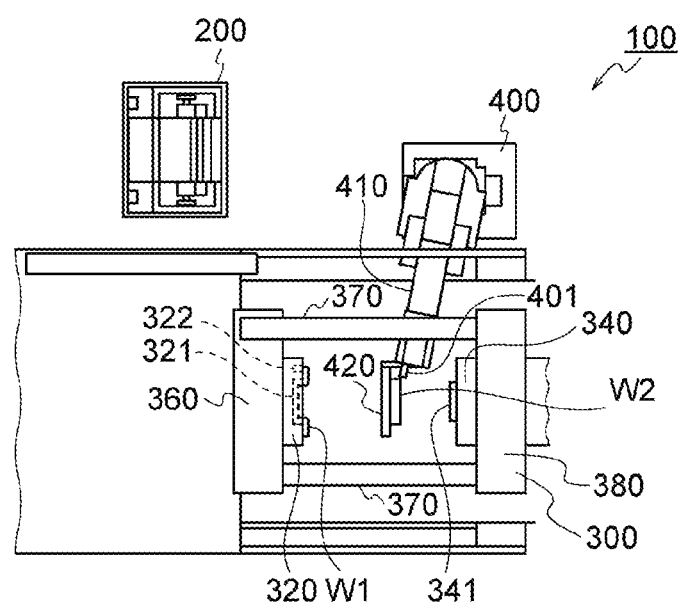
FIG. 13 is a top view showing a state, continued from the state shown FIG. 12, during the course of producing a molded article by molding a work in the work molding system shown in FIG. 1, etc.

Then, gas is sucked from the flow path 330 by the suction pump 310 in the molding device 300, and the suction of gas from the flow paths 448 by the suction pump 430 in the conveying device 400 is stopped. Consequently, the formed work is delivered to the movable mold 320 of the molding device 300 from the holding member 420 of the conveying device 400, and the delivered formed work is vacuum-sucked onto the movable mold 320. If it is determined that the formed work has been vacuum-sucked onto the movable mold 320, the force with which gas is sucked from the flow path 330 by the suction pump 310 is increased. Consequently, the formed work is placed in the recess 321 of the movable mold 320, and the formed work is vacuum-molded so as to conform to the shape of the recess 321. Thereafter, the holding member 420 is moved by the movement mechanism 410 such that the molded article holding part 460 of the holding member 420 comes close to the fixed mold 340. Then, when the molded article held by the protrusion 341 of the fixed mold 340 has come close to the molded article holding part 460 of the holding member 420, gas is sucked from the flow paths 466 by the suction pump 430 in the conveying device 400. Consequently, the molded article is vacuum-sucked onto the suction pads 462 of the molded article holding part 460. Thereafter, as shown in FIG. 13, the holding member 420 is moved by the movement mechanism 410 such that the holding member 420 moves away from the fixed mold 340, and the holding member 420 is moved to a storage case or the like (not shown) of the molded article by the movement mechanism 410. Then, if it is determined that the holding member 420 has moved to the storage case or the like of the molded article, the suction of gas from the flow paths 466 by the suction pump 430 in the conveying device 400 is stopped. Consequently, the molded article that has been held by the holding member 420 is stored into the storage case or the like. It is noted that such an operation of storing a molded article that has been held by the holding member 420 into the storage case or the like is also referred to as "discharge of a molded article".

In this manner, in the present embodiment, when a formed work that is to be molded by the molding device 300 is caused, by the conveying device 400, to be held by the movable mold 320 of the molding device 300, a molded article produced by the molding device 300 is taken out from the molding device 300 by the conveying device 400. When a molded article produced by the molding device 300 is taken out from the molding device 300 by the conveying device 400, the molded article is held, in the holding member 420, at a portion (i.e., the molded article holding part 460) different from the portion (i.e., the work holding mechanism 440) at which a formed work is held when the formed work is conveyed to the molding device 300 by the conveying device 400.

In the operation described above, after the movable mold 320 has been spaced apart from the fixed mold 340, first, the formed work held by the holding member 420 of the conveying device 400 is delivered to the movable mold 320, and then the molded article is taken out from the fixed mold 340 by the holding member 420. However, the present embodiment is not limited to such an embodiment. As another embodiment, after the movable mold 320 has been spaced apart from the fixed mold 340, first, the molded article held by the protrusion 341 of the fixed mold 340 may be held by the molded article holding part 460 of the holding member 420, then the formed work held by the work holding mechanism 440 of the holding member 420 may be delivered to the movable mold 320, and, finally, the holding member 420 may be spaced apart from the molding device 300, thereby storing, into a storage case or the like, the molded article held by the molded article holding part 460 of the holding member 420.

If it is determined that the formed work delivered from the holding member 420 of the conveying device 400 to the movable mold 320 of the molding device 300 has been vacuum-molded, the molded article has been taken out from the fixed mold 340 of the molding device 300 by the holding member 420, and the holding member 420 has been retracted from the space between the movable mold 320 and the fixed mold 340, the movable mold holding part 360 moves in a direction approaching the fixed mold holding part 380 (i.e., rightward in FIGS. 10 to 13), and the movable mold 320 and the fixed mold 340 come into contact with each other as shown in FIG. 10. Then, if it is determined that the movable mold 320 and the fixed mold 340 are in contact with each other, a resin is supplied from the resin supply part 390 through the resin supply path 350 to a cavity formed between the movable mold 320 and the fixed mold 340. Consequently, resin injection molding is performed on the front surface (specifically, the surface opposite to the surface facing the recess 321) of the formed work that has been vacuum-molded by the movable mold 320. A molded article is produced in this manner, and the produced molded article is held by the protrusion 341 of the fixed mold 340. It is noted that, while a molded article is produced by performing resin injection molding on the formed work in the molding device 300, the next formed work is conveyed from the conveying device 400 toward the molding device 300, and the formed work is heated by the heater 450 of the conveying device 400 during this conveying.

According to the work molding method using the work molding system 100 of the present embodiment, while a molded article is produced by performing molding of a formed work by the molding device 300 (specifically, resin injection molding on the formed work), a formed work that is to be molded next by the molding device 300 is heated while being conveyed toward the molding device 300 by the conveying device 400. In this manner, while a molded article is produced by performing molding of a formed work by the molding device 300, a formed work that is to be molded next is heated while being conveyed toward the molding device 300, whereby it is possible to shorten the overall processing time when producing molded articles by sequentially molding a plurality of formed works. Such a technical matter will be described with reference to FIG. 14. It is noted that a chart (a) shows a work molding method using the work molding system 100 according to the present embodiment, and a chart (b) shows a work molding method using a work molding system according to the conventional art.

In the conveying device 400 of the work molding system 100 according to the present embodiment, a formed work formed by the work forming device 200 can be held and heated by the work holding part 470 (i.e., the work holding mechanism 440 and the heater 450) of the holding member 420, and a molded article molded from the formed work by the molding device 300 can be held by the molded article holding part 460 of the holding member 420. Accordingly, while resin injection molding is performed on the formed work in the molding device 300, the next formed work can be conveyed and heated by the conveying device 400. Specifically, as shown in the chart (a) of FIG. 14, while resin injection molding is performed on a first formed work in the molding device 300, a second formed work can be conveyed and heated by the conveying device 400. Since an articulated robot is used as the movement mechanism 410 of the conveying device 400, and the movement mechanism 410 is provided outside the molding device 300, it is possible to prevent the movement mechanism 410 and the constituent members of the work molding system 100 from coming into contact with each other even if the space between the movable mold 320 and the fixed mold 340, in the case of being spaced apart from each other, is small. In contrast, in the work molding system according to the conventional art, no heater is provided in the conveying device that conveys a formed work formed by the work forming device to the molding device. Accordingly, after a formed work formed by the work forming device has been taken out from the work forming device, it is necessary to convey the formed work to a heating device provided separately from the molding device, and to heat the formed work by the heating device. Then, the formed work that has been heated by the heating device is conveyed to the molding device by the conveying device. Furthermore, in the work molding system according to the conventional art, the holding member of the conveying device has neither a holding surface for holding a sheet-like formed work nor a holding surface for holding a molded article, and, therefore, it takes time, after a sheet-like formed work has been delivered to the movable mold of the molding device, to receive a molded article from the fixed mold and to discharge the molded article.

Figure 14:
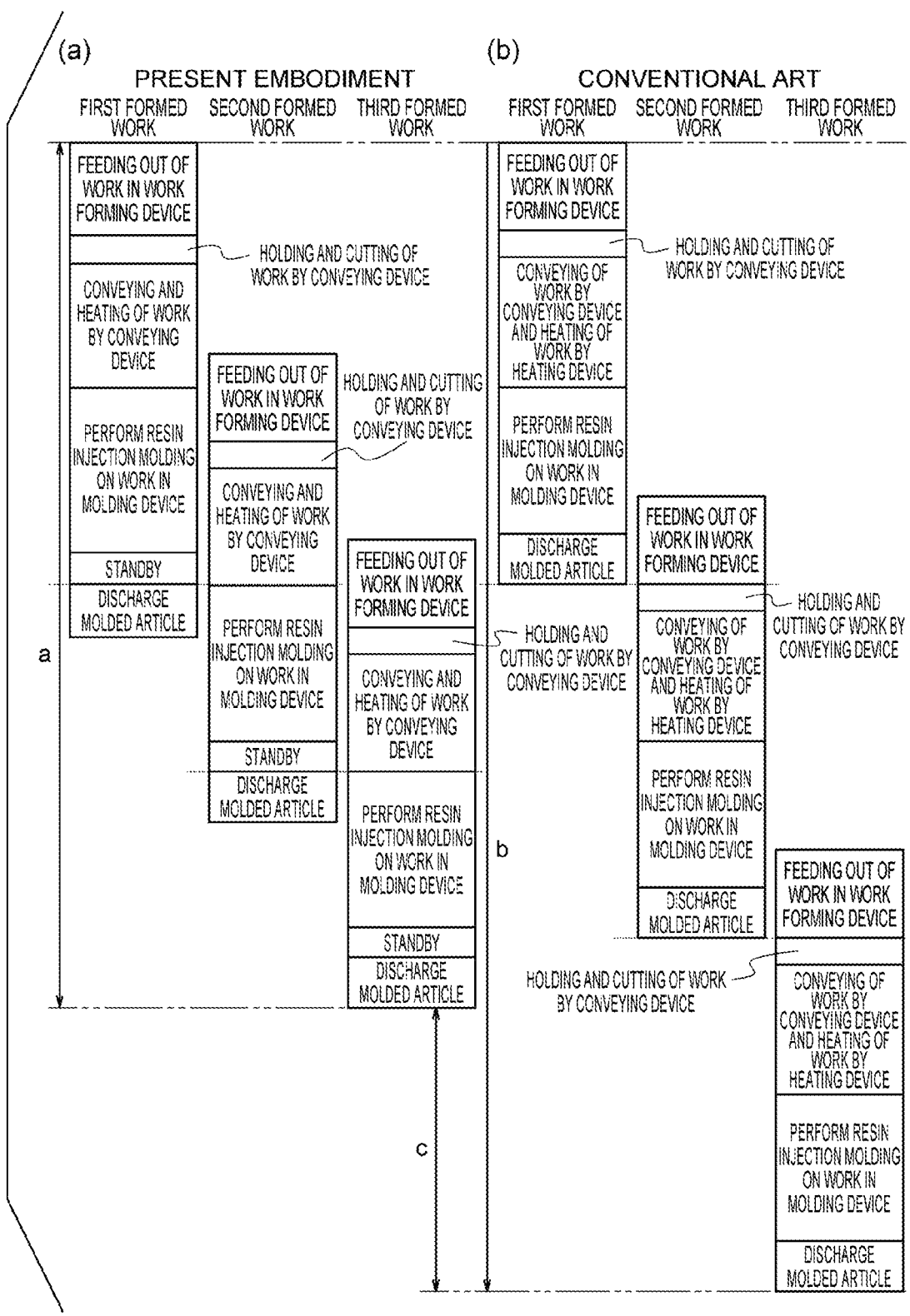
FIG. 14 is a chart (a) illustrating a work molding method using a work molding system according to an embodiment of the present invention, and chart (b) illustrating a work molding method using a work molding system according to a conventional art.

In the work molding system according to the conventional art, as shown the chart (b) of FIG. 14, the process of feeding out the work in the work forming device, the process of causing the conveying device to hold the fed-out work and cutting the work, the process of heating a sheet-like formed work in order to soften the formed work, the process of performing resin injection molding on the formed work mold using a mold, and the process of discharging a molded article are performed in order, process by process. This poses the problem that the overall processing time is increased when molded articles are produced by molding a plurality of formed works. Specifically, in the work molding method using the work molding system according to the conventional art, time b is required to produce three molded articles. In contrast, with the work molding method using the work molding system 100 according to the present embodiment, while resin injection molding is performed on a formed work in the molding device 300, the next formed work is conveyed and heated by the conveying device 400, and, therefore, the time required to produce three molded articles is a, and the overall processing time can be shortened by time c.

It is noted that body parts 441*a*, 441*b* and movable molds 320*a*, 320*b* shown in FIGS. 15 and 16 may be used in place of the body part 441 of the work holding mechanism 440 and the movable mold 320 of the molding device 300 described above. That is, the body part 441*a* that holds a formed work so as to form a recessed shape toward the movable mold 320*a* and the movable mold 320*a* may be used, or the body part 441*b* composed of a plurality of portions disposed so as to be inclined at a predetermined angle and the movable mold 320*b* may be used. The body parts 441*a*, 441*b* are formed such that the shapes of formed works held by the body parts 441*a*, 441*b* and the three-dimensional shape of the movable molds 320*a*, 320*b* are substantially the same. It is noted that the illustrations of fixed molds that are provided so as to be opposed to the movable molds 320*a*, 320*b* are omitted in FIGS. 15 and 16. The body parts 441*a*, 441*b* have the same configuration as the above-described body part 441 except that the shapes of the body parts 441*a*, 441*b* are different. When such body parts 441*a*, 441*b* are used, the amount of usage of the work used in the work molding system 100 can also be reduced as compared with when the work is held so as to have a flat shape (indicated by reference character W). Since the body parts 441*a*, 441*b* are configured to hold formed works so as to conform to the shapes of the recesses 321*a*, 321*b* of the movable molds 320*a*, 320*b*, the formed works can be easily vacuum-molded so as to conform to the shapes of the recesses 321*a*, 321*b*.

Figure 17:
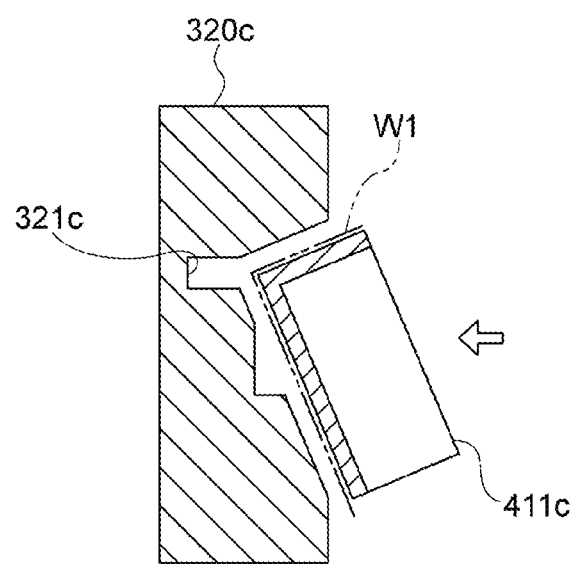
FIG. 17 is a side view schematically showing still another configuration of the work holding mechanism and the molding device in the work molding system shown in FIG. 1.
Figure 18:
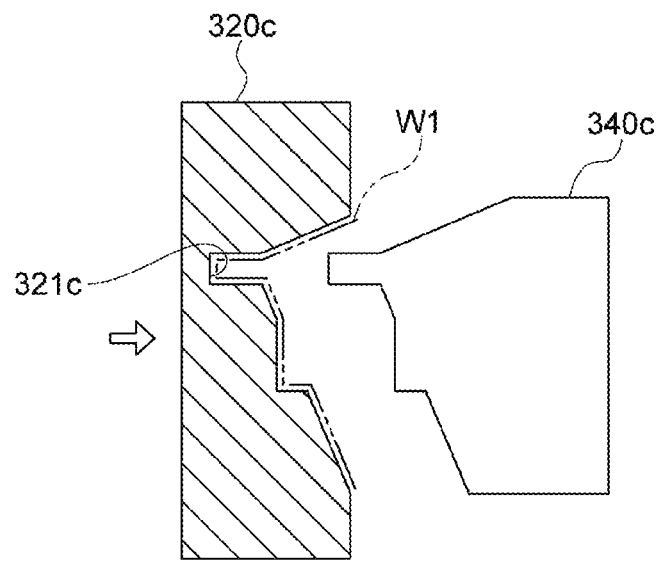
FIG. 18 is a configuration diagram showing a configuration in a case where a work is molded by the molding device shown in FIG. 17.

Although the three-dimensional shapes of the body parts 441, 441*a*, 441*b* described above are formed so as to be substantially the same as the three-dimensional shapes of the recesses 321, 321*a*, 321*b* provided on the movable molds 320, 320*a*, 320*b* to which the formed works are to be delivered by the body parts 441, 441*a*, 441*b*, the three-dimensional shapes are not limited to such embodiments. For example, when the three-dimensional shape (i.e., the three-dimensional shape of a movable mold 320*c* and a fixed mold 340*c*) of a molded article that is to be molded by the work molding system 100 is complex as shown in FIGS. 17 and 18, the shape of the body part of the work holding mechanism 440 may be configured to roughly conform to the shape of the movable mold 320*c* to which the formed work held by the work holding mechanism 440 is delivered. More specifically, as the body part of the work holding mechanism 440 that delivers a formed work to the movable mold 320*c* having a complex shape as shown in FIG. 17, a body part 441*c* that is formed so as to roughly conform to the shape of the movable mold 320*c*, but not to conform to the shape of a predetermined recess (e.g., a recess 321*c*) and so forth, may be used. When such a body part 441*c* is used, the formed work can be more easily vacuum-molded so as to conform to the shape of the recess 321*c* (see FIG. 18) than when the formed work is held so as to have a flat shape (indicated by reference character W). Furthermore, the amount of usage of the work in the work molding system 100 can be reduced. It is noted that the body part 441*c* has the same configuration as the body part 441 described above, except that the shape of the body part 441*c* is different.

Figure 19:
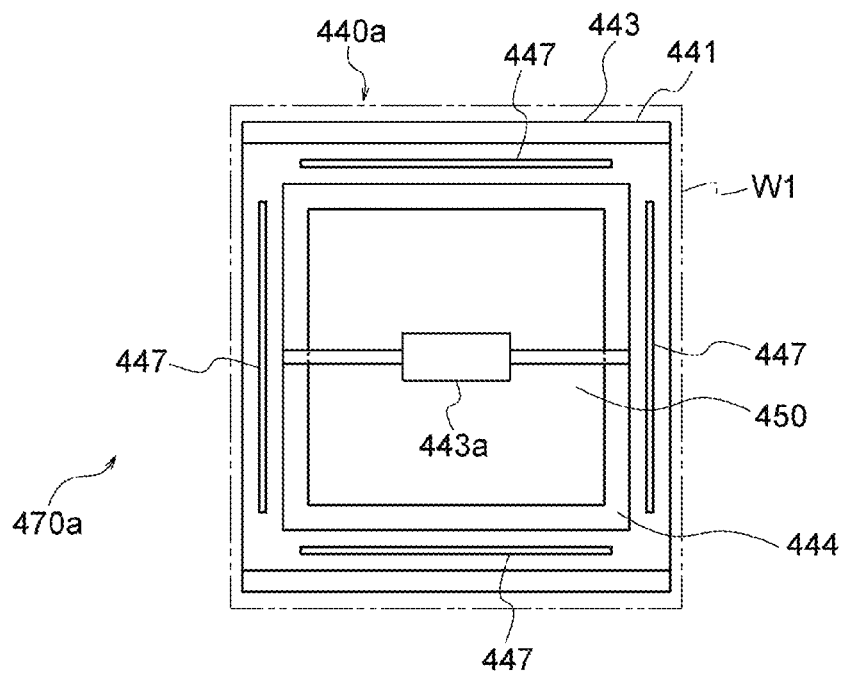
FIG. 19 is a front view schematically showing a configuration of a holding assist member additionally provided in the work holding part in the holding member shown in FIG. 3, etc.

A work holding part 470*a* (i.e., a work holding mechanism 440*a* and the heater 450) as shown in FIG. 19 may be used in the work molding system 100. More specifically, the work holding mechanism 440*a* is formed by additionally installing, in the work holding mechanism 440 described above, a holding assist member 443*a* for assisting the holding of the work by the frame-shaped member 443, the holding assist member 443*a* being provided inside the opening 444 of the frame-shaped member 443. When such a holding assist member 443*a* is included, it is possible to reliably hold a work so as to conform to the three-dimensional shape of the body part 441 even if the shape of the body part 441 is complex.

The work holding mechanism 440 which has the above-described configuration and which is for holding a work in the work molding system 100 for molding works includes the body parts 441, 441*a* to 441*c* having a three-dimensional shape including at least a recess or a protrusion (the protrusion 442, etc., in the above-described embodiment), and the adsorption part 449 for holding a work (i.e., a formed work) by adsorbing the work onto the body parts 441, 441*a* to 441*c* in conformity to the three-dimensional shape of the protrusion 442 provided in the body parts 441, 441*a* to 441*c*. Accordingly, by holding the work by adsorbing the work so as to conform to at least the three-dimensional shape of the protrusion 442, the amount of usage of the work in the work molding system 100 can be reduced as compared with when the work is held so as to have a flat shape.

The conveying device 400, which has the above-described configuration and which is for conveying a formed work formed by the work forming device 200 and a molded article produced by molding the formed work, includes the holding member 420 for holding the formed work and the molded article, and the movement mechanism 410 for moving the holding member 420. The holding member 420 includes the work holding part 470 (i.e., the work holding mechanism 440 and the heater 450) that holds and heats the formed work, and the molded article holding part 460 that holds the molded article. Accordingly, while resin injection molding is performed on a formed work in the molding device 300, the next formed work can be conveyed and heated by the conveying device 400. Specifically, as shown in the chart (a) of FIG. 14, while resin injection molding is performed on the first formed work in the molding device 300, the second formed work can be conveyed and heated by the conveying device 400.

The holding member 420, which has the above-described configuration and which includes the frame portion 423 for holding a formed work formed by the work forming device 200 and a molded article produced by molding the formed work, includes the work holding part 470 that holds a formed work and heats the formed work by the heating member (specifically, a heater 450) installed on the side of a structural material to which the frame portion 423 is attached, and the molded article holding part 460 that holds a molded article produced by molding the formed work. Therefore, the formed work held by the frame portion 423 can be heated by the heating member.

The work molding system 100, which has the above-described configuration and which is for producing a molded article by molding a work, includes the work forming device 200 that forms a work (i.e., a formed work), the molding device 300 that performs molding of a formed work formed by the work forming device 200, and the conveying device 400 that conveys the formed work formed by the work forming device 200 from the work forming device 200 to the molding device 300. The conveying device 400 includes the work holding mechanism 440 for holding a work, and the movement mechanism 410 for moving the work holding mechanism 440. The work holding mechanism 440 includes the body parts 441, 441*a* to 441*c* having a three-dimensional shape including at least a recess or a protrusion (the protrusion 442, etc., in the above-described embodiment), and the adsorption part 449 for holding a work by adsorbing the work onto the body parts 441, 441*a* to 441*c* in conformity to the three-dimensional shape of the protrusion 442 provided on the body parts 441, 441*a* to 441*c*. Accordingly, by holding the work by adsorbing the work in conformity to the three-dimensional shape of the protrusion 442, the amount of usage of the work when the work is molded by the work molding system 100 can be reduced as compared with when the work is held so as to have a flat shape.

In the work molding system 100 according to the present embodiment, as described above, the molding device 300 includes a female mold (i.e., the movable molds 320, 320*a* to 320*c*) having a three-dimensional shape including at least a recess, and the body parts 441, 441*a* to 441*c* of the work holding mechanism 440 include a protrusion (i.e., the protrusion 442) that can be fitted to at least a portion of a recess (i.e., the recesses 321, 321*a* to 321*c*) of the mold of the molding device 300.

It is noted that the conveying device 400, the holding member 420, the work holding mechanism 440, the work molding system 100, and the work molding method according to the present embodiment are not limited to the embodiment as described above, and various changes may be made thereto.

For example, a positioning mark may also be provided on the fixed mold 340 of the molding device 300. In this case, when a molded article is taken out from the fixed mold 340, the positioning of the conveying device 400 (specifically, the molded article holding part 460) relative to the molded article that is to be taken out from the fixed mold 340 can be performed.

Figure 20:
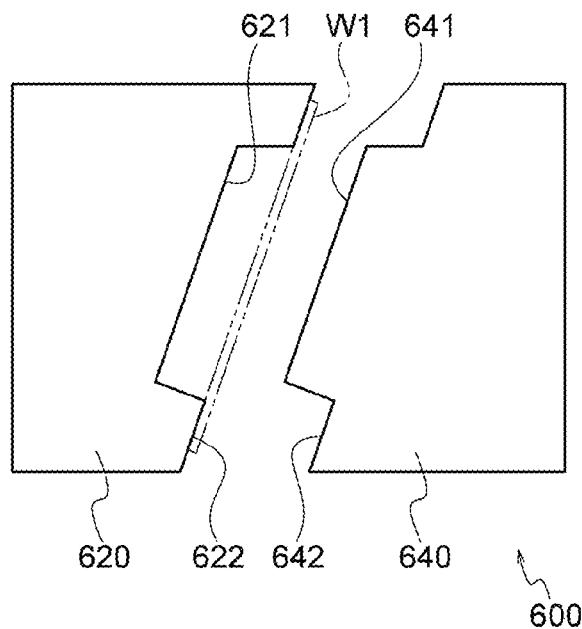
FIG. 20 is a configuration diagram showing another exemplary configuration of the molding device of the work molding system shown in FIG. 1.

As the molding device for producing a molded article by molding a sheet-like formed work, a molding device 600 including a movable mold 620 and a fixed mold 640 as shown in FIG. 20 may be used. More specifically, the molding device 600 shown in FIG. 20 includes the movable mold 620, the fixed mold 640, the movable mold holding part (not shown) that holds the movable mold 620, and the fixed mold holding part (not shown) that holds the fixed mold 640, and a cavity (hollow portion) having a recessed shape is formed between the movable mold 620 and the fixed mold 640 when the movable mold 620 and the fixed mold 640 are in contact with each other. More specifically, a recess 621 is formed on the movable mold 620, a protrusion 641 that can be placed in the recess 621 is provided on the fixed mold 640, and a cavity having a recessed shape is formed between the protrusion 641 and the recess 621 when the movable mold 620 and the fixed mold 640 are in contact with each other so as to place the protrusion 641 in the recess 621.

In the molding device 600 as shown in FIG. 20, a front surface 622 of the movable mold 620 and a front surface 642 of the fixed mold 640 are each inclined relative to a vertical plane (i.e., a plane extending along the up-down direction in FIG. 20). In such a case as well, with the conveying device 400 of the present embodiment, the movement mechanism 410 that moves the holding member 420 is an articulated robot, and, therefore, the work holding mechanism 440 and the molded article holding part 460 in the holding member 420 can be inclined relative to the vertical plane. Consequently, it is possible to appropriately deliver a sheet-like formed work held by the work holding mechanism 440 of the holding member 420 to the movable mold 620, and to appropriately take out and discharge a molded article held by the protrusion 641 of the fixed mold 640 by the molded article holding part 460 of the holding member 420.

Although the formed work is molded using the movable molds 320, 620 and the fixed molds 340, 640 (i.e., molds formed of a metal material) in the work molding system 100 described above, the molds are not limited to such an embodiment. For example, molds formed of a material (e.g., ceramic, etc.) other than metal may be used as the molds for performing molding in the molding device.

Figure 21:
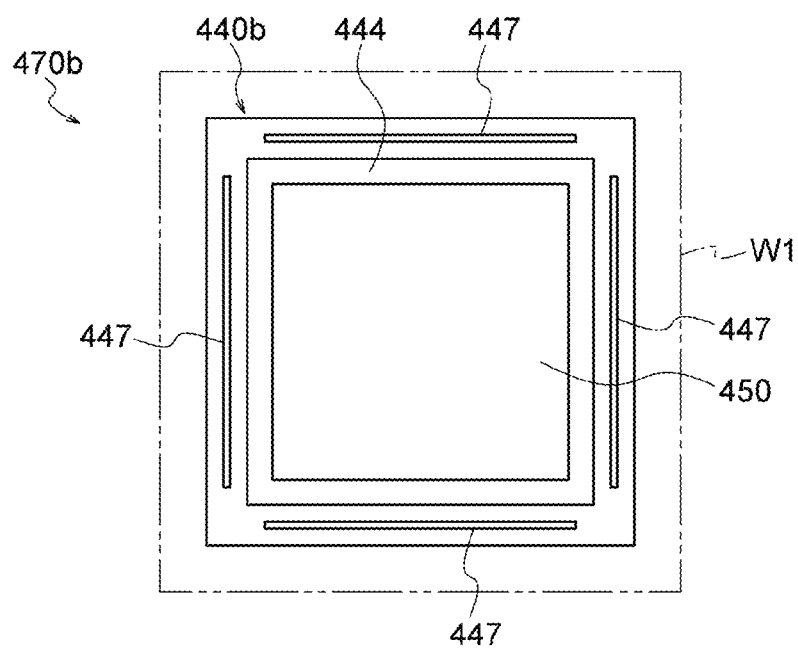
FIG. 21 is a configuration diagram showing another exemplary configuration of the work holding part in the holding member shown in FIG. 3.

A work holding part 470*b* (i.e., a work holding mechanism 440*b* and the heater 450) that holds a formed work in a standing state so as to have a flat shape in the downward direction as shown in FIG. 21 may be used as the work holding part. In other words, a work holding mechanism including a body part that does not have a three-dimensional shape including a recess or a protrusion may be used. Since the formed work can also be held and heated by such a work holding part 470*b*, the next formed work can be conveyed and heated by the conveying device 400 while resin injection molding is performed on a formed work in the molding device 300. Accordingly, while resin injection molding is performed on a first formed work in the molding device 300, a second formed work can be conveyed and heated by the conveying device 400.

The molding device in the work molding system according to the present invention is not limited to a molding device that performs vacuum molding and resin injection molding of a sheet-like formed work. A molding device that performs only vacuum molding or only resin injection molding of a sheet-like formed work, or a molding device that performs another type of molding may be used as the molding device in the work molding system according to the present invention.

The invention claimed is:

1. A work molding system for producing a molded article by molding a work, the system comprising:
    a work forming device configured to form a work;
    a molding device configured to perform molding of a formed work formed by the work forming device; and
    a conveying device configured to convey the formed work formed by the work forming device from the work forming device to the molding device, wherein
    the conveying device includes a holding member for holding the formed work formed by the work forming device and a molded article molded from the formed work by the molding device, and a movement mechanism for moving the holding member,
    the holding member includes a work holding part configured to hold and heat the formed work formed by the work forming device, and a molded article holding part configured to hold the molded article molded from the formed work by the molding device, the work holding part is composed of a work holding mechanism and a heater attached to the work holding mechanism, the formed work is vacuum-molded using a movable mold of the molding device, as a result of resin being supplied into a cavity having a recessed shape formed between the movable mold and a fixed mold, resin injection molding is performed on the front surface of the formed work that has been vacuum-molded using the movable mold, the work holding mechanism includes a body part, the body part has a configuration in which a base member and an elastic member composed of an elastic material are layered, and the elastic member being made of a material having heat resistance.

2. The work molding system according to claim 1, wherein the molding device performs vacuum molding and resin injection molding of the formed work formed by the work forming device.

3. The work molding system according to claim 2, wherein the molding device is configured to perform vacuum molding on one surface of the formed work fed to the molding device, and to perform resin injection molding on another surface thereof.

4. The work molding system according to claim 1, wherein the movement mechanism of the conveying device comprises an articulated robot.

5. The work molding system according to claim 1, wherein the work holding part of the holding member of the conveying device holds the formed work by vacuum suction.

6. The work molding system according to claim 1, wherein the molded article holding part of the holding member of the conveying device holds the molded article by vacuum suction.

7. The work molding system according to claim 1, wherein
the holding member of the conveying device includes a frame portion having a substantially rectangular shape, and
the work holding part is provided on a front surface of the frame portion of the conveying device, and the molded article holding part is provided on a back surface of the frame portion.

8. The work molding system according to claim 1, wherein a configuration for causing the work holding part to hold the formed work and a configuration for causing the molded article holding part to hold the molded article are different from each other in the holding member of the conveying device.

9. The work molding system according to claim 1, wherein the elastic member is configured to come into contact with the formed work.

10. The work molding system according to claim 1, wherein the elastic member is made of a flexible material.

* * * * *